June 21, 1932. E. S. HEBELER 1,864,435
ELECTRIC HEATING APPARATUS
Filed Oct. 18, 1929
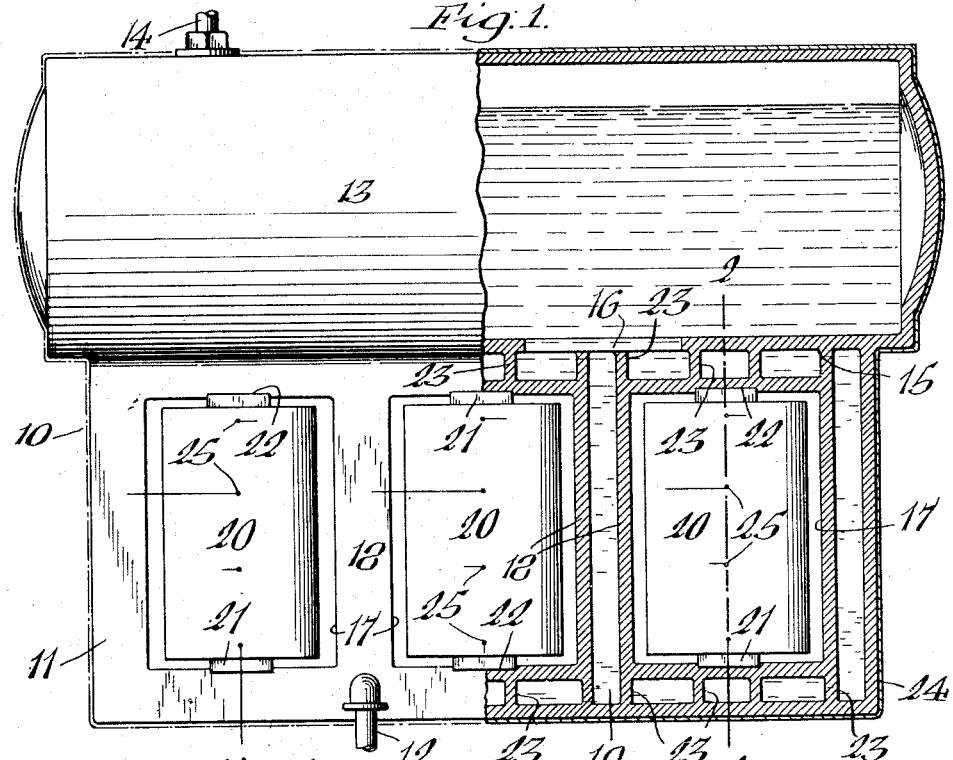
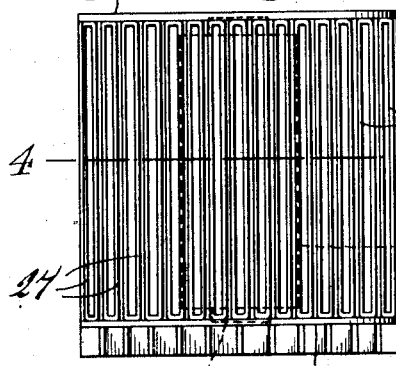
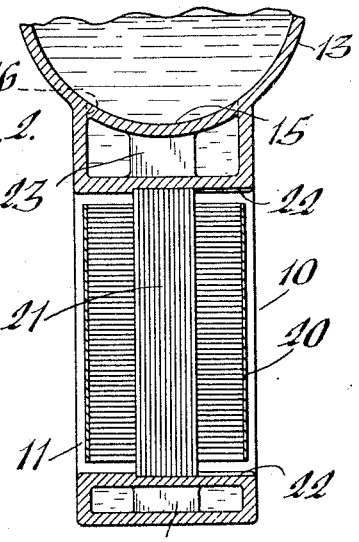
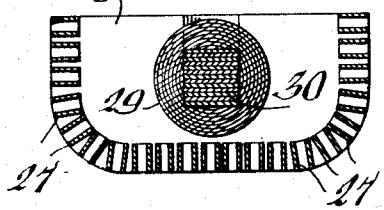
Inventor,
Edward S. Hebeler,
by Walter P. Geyer
Attorney.

Patented June 21, 1932

1,864,435

UNITED STATES PATENT OFFICE

EDWARD S. HEBELER, OF WILLIAMSVILLE, NEW YORK, ASSIGNOR TO ALLAN MANUFACTURING AND WELDING COMPANY, INCORPORATED, OF BUFFALO, NEW YORK, A CORPORATION OF NEW YORK

ELECTRIC HEATING APPARATUS

Application filed October 18, 1929. Serial No. 400,514.

This invention relates to a heating apparatus and more particularly to one of the type employing electricity as the heating medium.

Its chief object is the provision of a simple, inexpensive and efficient heating system of this character, which may be applied to a water heater, domestic room heater or the like, and wherein the heat is quickly and economically produced.

Another object of the invention is to provide an electrical heating appliance whose heating unit is a self-contained integral part of the device and which will not burn out, and wherein the heat is developed by the magnetic lines of force passing through the device.

In the accompanying drawing:—

Figure 1 is a sectional elevation of a water heater embodying my improved heating system. Figure 2 is a fragmentary cross-section taken on line 2—2, Figure 1. Figure 3 is a front elevation of a domestic type of heater or radiator embodying my invention. Figure 4 is a horizontal section thereof taken on line 4—4, Figure 2.

Similar characters of reference indicate corresponding parts throughout the several views.

Referring now to Figures 1 and 2 where I have shown my heating system applied to a water heater, 10 indicates, generally, a water tank or boiler including a lower section 11 containing the heating units and an intake pipe 12, and an upper section 13 having an outlet pipe 14, the two sections being separated by a partition 15 having one or more openings 16 therein for establishing communication between the two sections.

The lower tank-section 11 contains a series of substantially rectangular openings or chambers 17 disposed transversely thereof and open at their opposite sides, the connecting webs 18 between the chambers having water spaces 19 communicating with the corresponding spaces above and below said chambers. Removably arranged within the latter are electromagnets 20 connected to a source of alternating current and having laminated cores 21 which may engage guide grooves 22 in the top and bottom walls of their respective chambers. These electromagnets constitute the source of heat and act to set up magnetic lines of force within the walls of the heater, such lines taking a circuitous path about the electromagnets and producing the desired friction to heat the walls of the heater, which heat is thence transmitted to the water in the tank. To complete the magnetic path between the walls of the chambers 17 and the surrounding walls of the water tank, upper and lower webs 23 serve to connect said chambers with the partition 15 and the bottom wall of the tank-section 11. The outer walls of the tank are, by preference, provided with a covering or jacket 24 of asbestos or like heat-insulating material to prevent dissipation of heat through radiation. In practice, the cross-sectional area of the tank walls surrounding each electromagnet and through which the magnetic lines of force pass in somewhat less or approximately equal to the area of the laminated core of the coil. By constructing the core of laminations, its overheating is prevented.

The electromagnets 20 may be provided with different connecting taps 25 at varying points along its coil to enable the user to utilize the amount of current necessary for heating the water to the temperature desired.

In operation, the current passes through the coils of the electromagnets, thereby energizing them and setting up magnetic lines of force which pass through the surrounding walls of the heater body and in so doing create a friction therein and directly heat such walls. The heat in these walls is then transferred to the water in the tank.

In the modification illustrated in Figures 3 and 4, showing a radiator or room heater, 26 indicates a suitable supporting base, 27 a series of heating elements secured to and rising from said base and preferably in the form of loops which may be arranged in the manner shown or in any other appropriate fashion. Applied to the upper ends of these heating elements and rigidly secured thereto is a top plate 28 and enclosed within this resulting structure is an upright electromagnet 29 whose laminated core 30 engages the base and top plate. When the electromagnet is energized, the magnetic lines of force pass circuitously through the top plate 28, heating elements 27 and base 26, the friction created heating said elements and the heat radiating therefrom to warm the room.

While the combination and arrangement of parts cooperate to produce a very efficient electric heater, it is to be understood that the details thereof may be modified without departing from the spirit of the invention. Furthermore, while I have shown my heating system applied as a water heater and as a radiator or domestic type of heater, it is applicable for various other heating purposes, such as hot plates, grills, electric stoves and the like.

I claim as my invention:—

An electric water heater, comprising a tank including an upper section and a lower section, the latter having a series of openings extending transversely thereof and the walls being constructed to permit the passage of magnetic lines of force therethrough, and electromagnets disposed in said openings and having laminated cores connected at their ends to the adjoining walls of the lower tank-section.

EDWARD S. HEBELER.